US012561559B2

(12) United States Patent
Feng et al.

(10) Patent No.: US 12,561,559 B2
(45) Date of Patent: Feb. 24, 2026

(54) NEURAL NETWORK TRAINING METHOD AND APPARATUS, ELECTRONIC DEVICE, MEDIUM AND PROGRAM PRODUCT

(71) Applicant: Beijing Baidu Netcom Science Technology Co., Ltd., Beijing (CN)

(72) Inventors: Danlei Feng, Beijing (CN); Long Lian, Beijing (CN); Dianhai Yu, Beijing (CN); Xuefeng Yao, Beijing (CN); Xinxuan Wu, Beijing (CN); Zhihua Wu, Beijing (CN); Yanjun Ma, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 1037 days.

(21) Appl. No.: 17/558,355

(22) Filed: Dec. 21, 2021

(65) Prior Publication Data

US 2022/0374704 A1 Nov. 24, 2022

(30) Foreign Application Priority Data

May 19, 2021 (CN) .......................... 202110548446.8

(51) Int. Cl.
*G06N 3/08* (2023.01)
*G06F 9/48* (2006.01)
(Continued)

(52) U.S. Cl.
CPC ............. *G06N 3/08* (2013.01); *G06F 9/4881* (2013.01); *G06F 9/5044* (2013.01);
(Continued)

(58) Field of Classification Search
CPC .......... G06N 3/08; G06N 3/044; G06N 3/092; G06N 3/0442; G06N 3/045; G06F 9/4881;
(Continued)

(56) References Cited

U.S. PATENT DOCUMENTS

| 6,757,897 | B1 * | 6/2004 | Shi | ......................... G06F 9/4881 |
| | | | | 718/107 |
| 11,468,338 | B2 * | 10/2022 | Rossi | ....................... G06N 3/10 |

(Continued)

FOREIGN PATENT DOCUMENTS

| CN | 108694694 A | 10/2018 |
| CN | 110135575 A | 8/2019 |

(Continued)

OTHER PUBLICATIONS

Jia et al. Beyond Data and Model Parallelism for Deep Neural Networks [retrieved on Jul. 30, 2025]. Retrieved from the Internet: <URL: https://arxiv.org/abs/1807.05358> (Year: 2018).*

(Continued)

*Primary Examiner* — Michael J Huntley
*Assistant Examiner* — Alfredo Campos
(74) *Attorney, Agent, or Firm* — Moore & Van Allen PLLC

(57) ABSTRACT

The disclosure provides a neural network training method and apparatus, an electronic device, a medium and a program product, and relates to the field of artificial intelligence, in particular to the fields of deep learning and distributed learning. The method includes: acquiring a neural network for deep learning; constructing a deep reinforcement learning model for the neural network; and determining, through the deep reinforcement learning model, a processing unit selection for the plurality of the network layers based on a duration for training each of the network (Continued)

layers by each type of the plurality of types of the processing units, and a cost of each type of the plurality of types of the processing units.

18 Claims, 5 Drawing Sheets

(51) Int. Cl.
| | |
|---|---|
| *G06F 9/50* | (2006.01) |
| *G06N 3/044* | (2023.01) |

(52) U.S. Cl.
CPC ........... *G06F 9/5066* (2013.01); *G06N 3/044* (2023.01); *G06F 2209/5019* (2013.01); *G06F 2209/5022* (2013.01)

(58) Field of Classification Search
CPC ................. G06F 9/5044; G06F 9/5066; G06F 2209/5019; G06F 2209/5022
See application file for complete search history.

(56) References Cited

U.S. PATENT DOCUMENTS

| | | | | |
|---|---|---|---|---|
| 2007/0067606 | A1* | 3/2007 | Lin ....................... | G06F 9/5044 712/10 |
| 2010/0223213 | A1* | 9/2010 | Su ......................... | G06F 9/5066 712/30 |
| 2018/0183660 | A1* | 6/2018 | Byers .................. | H04L 41/0853 |
| 2018/0293492 | A1* | 10/2018 | Kalamkar ................. | G06T 1/20 |
| 2020/0210239 | A1 | 7/2020 | Geigel | |

FOREIGN PATENT DOCUMENTS

| | | |
|---|---|---|
| CN | 111383161 A | 7/2020 |
| CN | 112202928 A | 1/2021 |
| CN | 112424797 A | 2/2021 |
| CN | 112464784 A | 3/2021 |
| CN | 112764893 A | 5/2021 |
| CN | 112771543 A | 5/2021 |
| JP | 2017182114 A | 10/2017 |
| JP | 2019040365 A | 3/2019 |

OTHER PUBLICATIONS

Mirhoseini et al. Device Placement Optimization with Reinforcement Learning [retrieved on Jul. 30, 2025]. Retrieved from the Internet: <URL: https://arxiv.org/abs/1706.04972> (Year: 2017).*

Sergio Moreno-Alvarez, Juan M. Haut, Mercedes E. Paoletti, Juan A. Rico-Gallego, Heterogeneous model parallelism for deep neural networks, Neurocomputing, vol. 441, 2021, pp. 1-12, ISSN 0925-2312, https://doi.org/10.1016/j.neucom.2021.01.125. (Year: 2021).*

Dean et al. Ng. 2012. Large scale distributed deep networks. In Proceedings of the 26th International Conference on Neural Information Processing Systems—vol. 1 (NIPS'12), vol. 1. Curran Associates Inc., Red Hook, NY, USA, 1223-1231. (Year: 2012).*

First Search Report issued by the Chinese Patent Office for Chinese Patent Application No. 2021105484468.

Supplemental Search Report issued by the Chinese Patent Office for Chinese Patent Application No. 2021105484468.

First Office Action for Related Japanese Application No. 2022-007109, issued Mar. 22, 2023, 6 pages.

* cited by examiner

200

202

A neural network for deep learning is acquired, wherein the neural network includes multiple network layers, and each of the Multiple types of processing units

204

A long short-term memory (LSTM) model for the neural network is constructed , wherein the LSTM model includes multiple model layers corresponding to the multiple network layers in a one-to-one correspondence

206

The LSTM model Is used to determined, on the basis of a duration required for training each network layer by using each type of the multiple types of the processing units, and a cost of each type of the multiple types of the processing units, a processing unit selection for multiple network layers

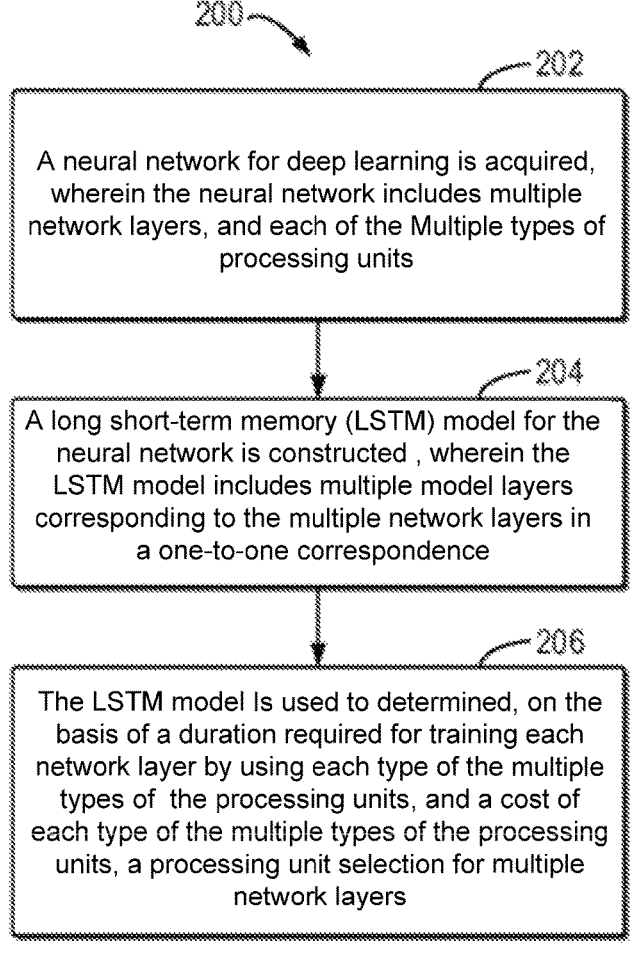

310

320

330

301

302

303

304

305

306

Network layer

Network layer

Network layer

Network layer

Network layer

Network layer

Fig. 3

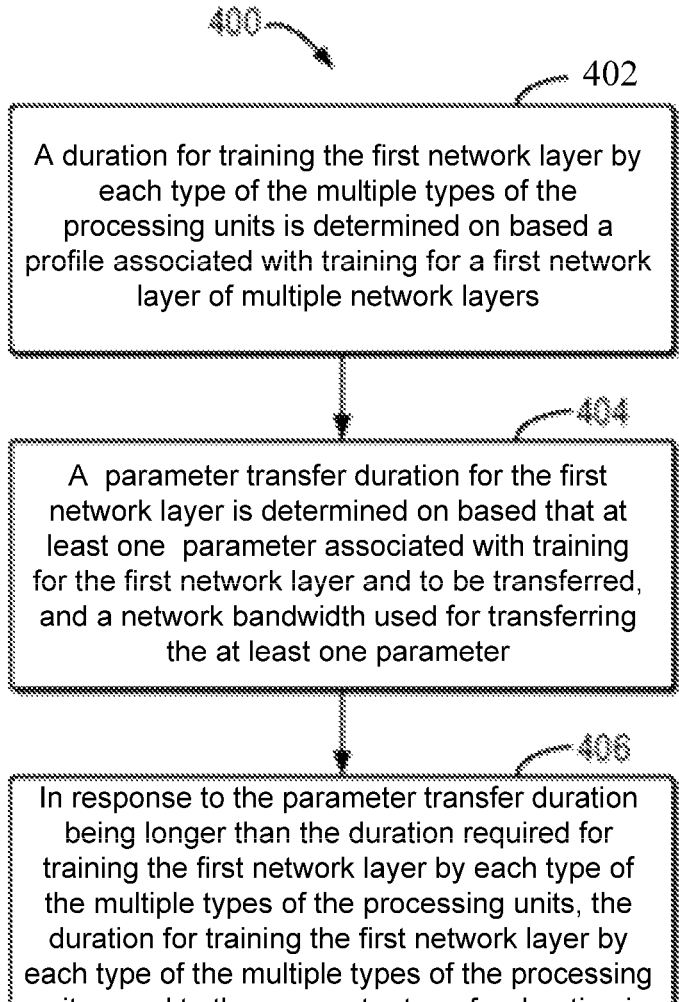

400

402

A duration for training the first network layer by each type of the multiple types of the processing units is determined on based a profile associated with training for a first network layer of multiple network layers

404

A parameter transfer duration for the first network layer is determined on based that at least one parameter associated with training for the first network layer and to be transferred, and a network bandwidth used for transferring the at least one parameter

406

In response to the parameter transfer duration being longer than the duration required for training the first network layer by each type of the multiple types of the processing units, the duration for training the first network layer by each type of the multiple types of the processing units equal to the parameter transfer duration is made

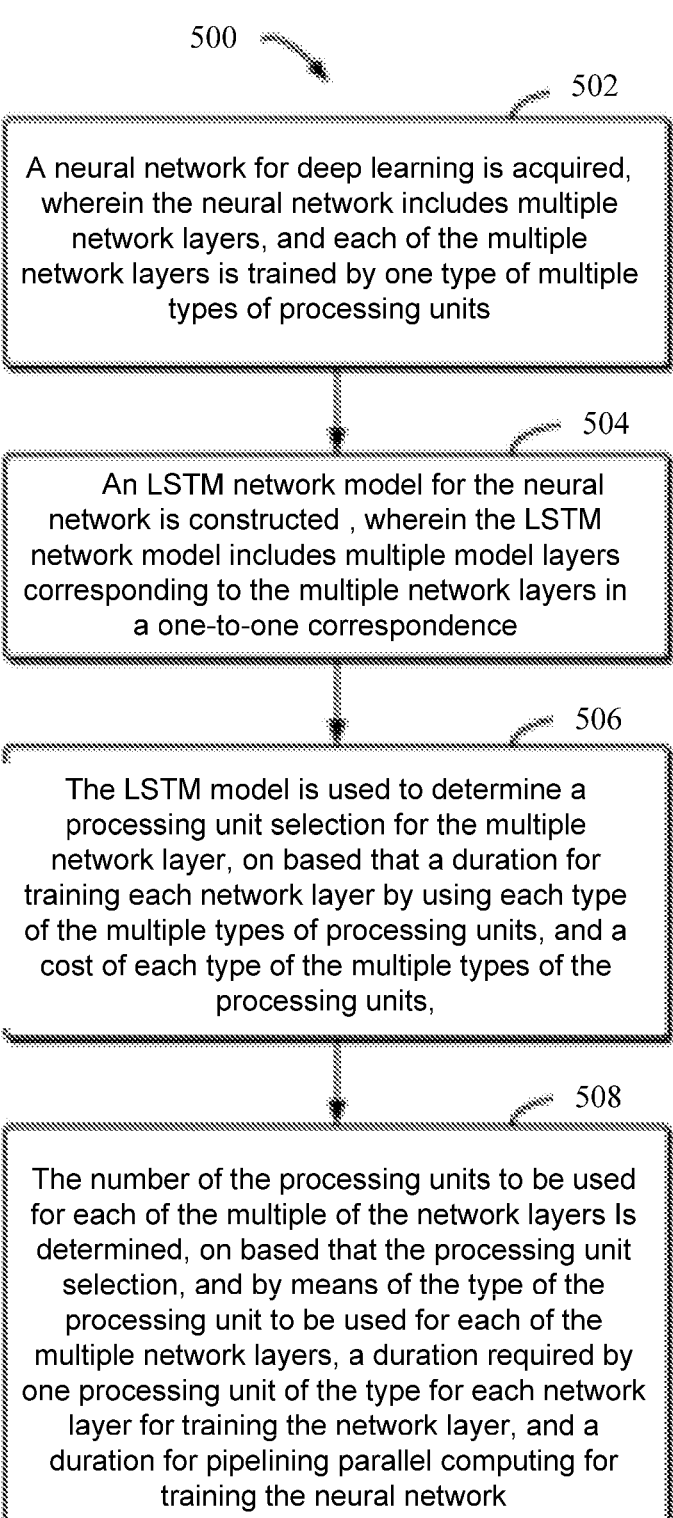

502

A neural network for deep learning is acquired, wherein the neural network includes multiple network layers, and each of the multiple network layers is trained by one type of multiple types of processing units

504

An LSTM network model for the neural network is constructed , wherein the LSTM network model includes multiple model layers corresponding to the multiple network layers in a one-to-one correspondence

506

The LSTM model is used to determine a processing unit selection for the multiple network layer, on based that a duration for training each network layer by using each type of the multiple types of processing units, and a cost of each type of the multiple types of the processing units,

508

The number of the processing units to be used for each of the multiple of the network layers Is determined, on based that the processing unit selection, and by means of the type of the processing unit to be used for each of the multiple network layers, a duration required by one processing unit of the type for each network layer for training the network layer, and a duration for pipelining parallel computing for training the neural network

Fig. 5

NEURAL NETWORK TRAINING METHOD AND APPARATUS, ELECTRONIC DEVICE, MEDIUM AND PROGRAM PRODUCT

TECHNICAL FIELD

The disclosure relates to the field of a computer technique, and in particular to a neural network training method, a video split screen wire apparatus, an electronic device, a non-transitory storage medium and a computer program product, which can be used in the field of artificial intelligence, and in particular in the field of deep learning and in the field of distributed learning.

BACKGROUND

As data scale and model scale of a deep learning model grow gradually, stand-alone training cannot meet business requirements of deep learning, so distributed training has become a basis of deep learning training. Since a central processing unit and a special processing unit such as a graphics processing unit can be used for the distributed training at the same time, it may be considered how to improve a throughput rate of model training as far as possible by giving full play to input and output advantages of the central processing unit and a computing power advantage of the special processing unit. For example, it may be considered how to maximize the throughput rate of model training and minimize machine cost as far as possible by specifically dividing different network layers of a neural network for deep learning to run in different processing units.

However, a mainstream distributed training mode in a traditional art mainly adopts a dynamic programming method to solve an optimal device division method on a heterogeneous device, which result in the problems of poor generalization, inability to solve a constrained problem and inability to adapt to a change of a modeling function.

SUMMARY

The embodiments of the disclosure provide a neural network training method and apparatus, an electronic device, a non-transitory storage medium and a computer program product.

In a first aspect of the disclosure, the neural network training method is provided. The method includes: a neural network for deep learning is acquired, wherein the neural network includes multiple network layers, and each of the plurality of network layers is trained by one type of multiple types of processing units; a deep reinforcement learning model for the neural network is constructed, wherein the deep reinforcement learning model includes multiple model layers corresponding to the multiple network layers in one-to-one correspondence; and a processing unit selection for the multiple the network layers is determined through the deep reinforcement learning model, based on a duration for training each of the network layers by each type of the multiple types of the processing units, and a cost of each type of the multiple types of the processing units, through the deep reinforcement learning model, wherein the processing unit selection included the type of the processing unit to be used for each of the multiple network layers, and the processing unit selection is used for making a total cost of the processing units used by the neural network below a cost threshold, in response to a duration for pipelining parallel computing for training the neural network being shorter than a present duration.

In a second aspect of the disclosure, the neural network training apparatus is provided. The apparatus includes: an acquisition component is configured to acquire a neural network for deep learning, wherein the neural network includes multiple network layers, and each of the multiple network layers is trained by one type of multiple types of processing units; a construction component is configured to construct a deep reinforcement learning model for the neural network, wherein the deep reinforcement learning model includes multiple model layers corresponding to the multiple network layers in one-to-one correspondence; and a first processing unit selection determination component is configured to determine through the deep reinforcement learning model, a processing unit selection for the multiple network layers based on a duration for training each of the network layers by each type of the multiple types of the processing units, and a cost of each type of the multiple types of the processing units, wherein the processing unit selection included the type of the processing unit to be used for each of the multiple network layers, and the processing unit selection is used for making a total cost of the processing units used by the neural network below a cost threshold, in response to a duration for pipelining parallel computing required for training the neural network being shorter than a present duration.

In a third aspect of the disclosure, the electronic device is provided. The electronic device includes at least one processor and a memory in communication connection with the at least one processor, wherein the memory stores an instruction capable of being executed by the at least one processor, and the instruction is executed by the at least one processor, so as to enable the at least one processor to execute the following steps: a neural network for deep learning is acquired, wherein the neural network includes multiple network layers, and each of the multiple network layers is trained by one type of a multiple types of processing units; a deep reinforcement learning model for the neural network is constructed, wherein the deep reinforcement learning model includes a multiple model layers corresponding to the multiple network layers in one-to-one correspondence; and a processing unit selection for the multiple network layers is determined based on a duration for training each of the network layers by each type of the multiple types of the processing units, and a cost of each type of the multiple types of the processing units, through the deep reinforcement learning model, wherein the processing unit selection included the type of the processing unit to be used for each of the multiple network layers, and the processing unit selection is used for making a total cost of the processing units used by the neural network below a cost threshold, in response to a duration for pipelining parallel computing for training the neural network being shorter than a present duration.

In a forth aspect of the disclosure, a non-statutory non-transitory storage medium storing a computer instruction. The computer instruction is used for enabling a computer to implement the method of the following steps according to the first aspect of the disclosure: a neural network for deep learning is acquired, wherein the neural network includes multiple network layers, and each of the multiple network layers is trained by one type of multiple types of processing units; a deep reinforcement learning model for the neural network is constructed, wherein the deep reinforcement learning model includes multiple model layers corresponding to the multiple network layers in one-to-one correspondence; and a processing unit selection for the multiple network layers is determined based on a duration for training each of the network layers by each type of the multiple types of the processing units, and a cost of each type of the multiple types of the processing units, through the deep reinforcement learning model, wherein the processing unit selection included the type of the processing unit to be used for each of the multiple network layers, and the processing unit selection is used for making a total cost of the processing units used by the neural network below a cost threshold, in response to a duration for pipelining parallel computing for training the neural network being shorter than a present duration.

In a fifth aspect of the disclosure, a computer program product is provided. The computer program product includes a computer program which executes execute the method of the following steps when executed by a processor: a neural network for deep learning is acquired, wherein the neural network includes multiple network layers, and each of the multiple network layers is trained by one type of multiple types of processing units; a deep reinforcement learning model for the neural network is constructed, wherein the deep reinforcement learning model includes multiple model layers corresponding to the multiple network layers in one-to-one correspondence; and a processing unit selection for the multiple network layers is determined based on a duration for training each of the network layers by each type of the multiple types of the processing units, and a cost of each type of the multiple types of the processing units, through the deep reinforcement learning model, wherein the processing unit selection included the type of the processing unit to be used for each of the multiple network layers, and the processing unit selection is used for making a total cost of the processing units used by the neural network below a cost threshold, in response to a duration for pipelining parallel computing for training the neural network being shorter than a present duration.

The neural network training method is provided in the disclose. By means of the method, a division method based on deep reinforcement learning may be adopted, and in response to constraint conditions such as certain time and machine cost, a division mode for an optimal device for each of the network layers is acquired through a deep reinforcement learning method, so as to acquire an optimal training throughput rate for a deep learning model. Therefore, the neural network may be divided the most reasonably, so as to realize distributed training, improve efficiency of the deep learning, and improve, by reducing cost of the deep learning by a user, cost of using the deep learning by the user.

It should be understood that a description in the summary is not intended to limit key or important features of the embodiments in the disclosure, nor is it intended to limit the scope of the disclosure. Other features of the disclosure will become readily apparent through the following description.

BRIEF DESCRIPTION OF THE DRAWINGS

By describing the exemplary embodiments of the disclosure in more detail with reference to the accompanying drawings, the above and other objectives, features, and advantages of the disclosure will become more apparent, where in the exemplary embodiments of the disclosure, identical reference numerals generally represent identical parts. It should be understood that the accompanying drawings are used for a better understanding of the solution and are not to be construed as limiting the disclosure. In the accompanying drawings:

FIG. 2 shows a flow diagram of a neural network training method 200 according to the embodiment of the disclosure;

FIG. 3 shows a schematic diagram of a divided neural network 300 according to the embodiment of the disclosure;

FIG. 4 shows a flow diagram of a neural network training method 400 according to the embodiment of the disclosure;

FIG. 5 shows a flow diagram of a neural network training method 500 according to the embodiment of the disclosure;

In the various figures, identical or corresponding reference numerals represent identical or corresponding portions.

DETAILED DESCRIPTION OF THE EMBODIMENTS

Figure 1:
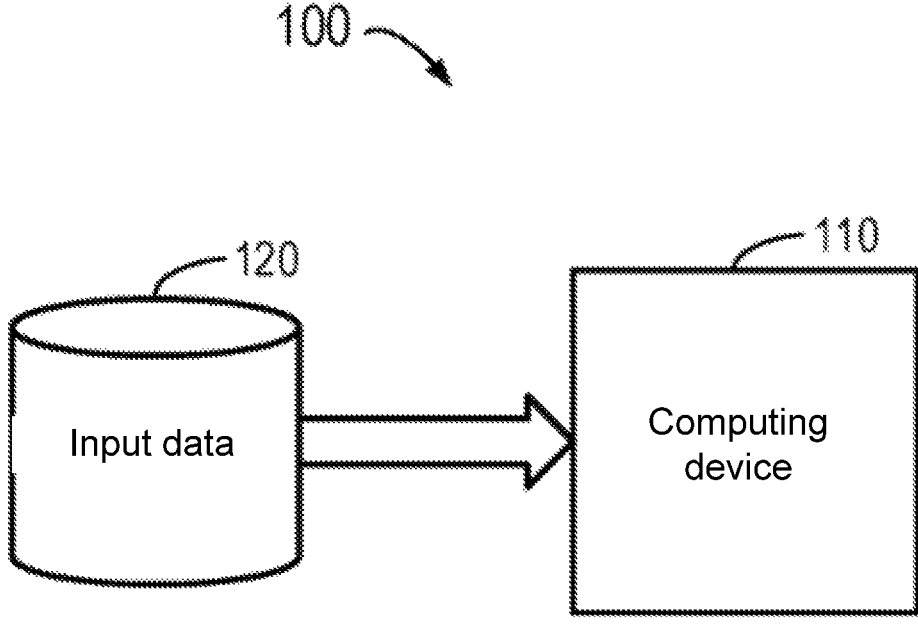
FIG. 1 shows a schematic block diagram of a neural network training environment 100 in which neural network training methods in certain embodiments of the disclosure may be implemented.

The preferred embodiments of the disclosure will be described in more detail below with reference to the accompanying drawings. While the preferred embodiments of the disclosure are shown in the accompanying drawings, it should be understood that the disclosure may be embodied in various forms and should not be limited by the embodiments set forth herein. On the contrary, these embodiments are provided to make the disclosure more thorough and complete, and to fully convey the scope of the disclosure to those skilled in the art.

Terms "include" and variations thereof used herein represent open inclusion, that is, "include but not limited to". Terms "or" means "and/or" unless specifically stated. Term "based on" means "at least partially on the basis of". Terms "one exemplary embodiment" and "one embodiment" mean "at least one exemplary embodiment". Term "another embodiment" means "at least one another embodiment". Terms "first", "second" etc. may refer to different objects or identical objects. Other explicit and implicit definitions may also be included below.

As described above in the background art, in response to chips, etc., different processing units may be designated for training a network layer of a model, for example, a central processing unit is used for carrying out input and output intensive operations, such as embedded table lookup and modification of input data, and a special processing unit is used for carrying out computing intensive operations, such as a full connection and attention. However, in response to a network is complex, an optimal throughput may not be acquired by empirical division. Moreover, a mainstream distributed training mode in the traditional art has certain problems. For example, at present, a dynamic programming method is mainly used for solving an optimal apparatus division method on a heterogeneous device, for example, in both assembly parallel training methods proposed by Pipe-Dream and DAPPLE, dynamic programming method is used for solution. The dynamic programming method usually decomposes a problem into sub-problems to carry out solution, but a solution range thereof is extremely limited, and once a modeling method is changed or at least one model constraint is added, it is difficult to acquire an optimal solution. Therefore, the traditional art may not reasonably divide the neural network to realize distributed training, which not only affects efficiency of deep learning, but also affects experience of using the deep learning by a user due to relatively high cost of the deep learning by the user.

In order to at least partially solve the above problems and one or more of other potential problems, the embodiment of the disclosure provides a neural network training method. By means of the method, a division method based on deep reinforcement learning may be adopted, and under the at least one constraint conditions such as certain time and machine cost, an optimal device division mode for each network layer is acquired through a deep reinforcement learning method, so as to acquire an optimal training throughput rate for a deep learning model. Therefore, the neural network may be divided the most reasonably, so as to realize distributed training, improve efficiency of the deep learning, and improve, by reducing cost of the deep learning by the user, experience of using the deep learning by the user.

FIG. 1 shows a schematic block diagram of a neural network training environment 100 in which neural network training methods in certain embodiments of the disclosure may be implemented. According to at least one embodiment of the disclosure, the neural network training environment 100 may be a cloud environment. As shown in FIG. 1, the neural network training environment 100 includes a computing device 110. In the neural network training environment 100, input data 120, as an input of the computing device 110, is provided for the computing device 110. The input data 120 may include data associated with a neural network for the deep learning, data required for constructing a deep reinforcement learning model for the neural network, data required for determining a processing unit selection for multiple network layers of the neural network by using the deep reinforcement learning model, etc.

In the embodiment of the disclosure, the deep reinforcement learning model is used for deep reinforcement learning. The deep reinforcement learning combines a perception ability of the deep learning with a decision-making ability of reinforcement learning, may carry out determination according to an input state, and is an artificial intelligence method closer to a human thinking mode. Meanwhile, the deep reinforcement learning is also a new research focus in the field of artificial intelligence. The deep reinforcement learning combines, in a general form, the perception ability of the deep learning with the decision-making ability of the reinforcement learning, and may realize direct control from original input to output through an end-to-end learning mode. Since being proposed, a deep reinforcement learning method has made substantial breakthroughs in many tasks that require perception of high-dimensional original input data and decision control.

According to at least one embodiment of the disclosure, when it is needed to determine a processing unit selection for the neural network for the deep learning, associated data, as the input data 120, is provided for the computing device 110. Then, the computing device 110 constructs the deep reinforcement learning model for the neural network and uses the deep reinforcement learning model to determine the processing unit selection for the neural network. The processing unit selection may include a type of processing unit to be used for each of multiple network layers of the neural network, and may further include the number of the processing units to be used for each of the multiple network layers of the neural network. In addition, the computing device 110 may also output the processing unit selection, determined by using the deep reinforcement learning model, for the neural network.

It should be understood that the neural network training environment 100 is merely exemplary and not limiting, and is extensible. More computing devices 110 may be included therein, and more input data 120 may be provided for the computing devices 110, such that more users may utilize more computing devices 110 and even more input data 120 to simultaneously or non-simultaneously determine the processing unit selection for the multiple neural networks for the deep learning.

In the neural network training environment 100 shown in FIG. 1, a network may be used for inputting the input data 120 to the computing device 110.

According to at least one embodiment of the disclosure, the deep reinforcement learning model, may be trained by a long short-term memory (LSTM) network model, a convolution neural network (CNN) model and a recursive neural network (RNN) model. The LSTM network model is taken as an example of the deep reinforcement learning model below to describe determination, by using the deep reinforcement learning model, of the processing unit selection for the multiple network layers of the neural network, but the scope of protection of the disclosure is not limited thereto.

FIG. 2 shows a flow diagram of a neural network training method 200 according to the embodiment of the disclosure. Specifically, the neural network training method 200 may be carried out by the computing device 110 in the neural network training environment 100 shown in FIG. 1. It should be understood that the neural network training method 200 may also include at least one additional operation not shown and/or at least one operation shown may be omitted, and the scope of the disclosure is not limited in this respect.

In a block 202, the computing device 110 acquires the neural network for the deep learning. According to at least one embodiment of the disclosure, the neural network includes the multiple network layers, each of the multiple network layers is trained by one type of the multiple types of the processing units, and each network layer may be trained by multiple the same type of processing units in parallel.

According to at least one embodiment of the disclosure, the processing units for training the neural network for the deep learning may include a central processing unit and a special processing unit such as a graphics processing unit. It should be understood that the processing units may include various different types of processing units, such as processing units with better input and output processing abilities or better computing processing abilities, and are not limited to only the central processing unit and the special processing unit.

In a block 204, the computing device 110 constructs the LSTM model for the neural network acquired in the block 202. According to at least one embodiment of the disclosure, the LSTM model includes multiple model layers corresponding to the multiple network layers in one-to-one correspondence. Since an objective of the method 200 is to determine, under at least one constraint such as a duration for pipelining parallel computing required for training the neural network, the processing unit selection for the multiple network layers of the neural network for the deep learning, so as to make total cost of the processing units below a cost threshold, and then a problem that needs to be solved is that the constraints exist, but derivation cannot be carried out. Under the circumstance, the LSTM model with multiple model layers is used in the method 200, and the above problems are solved through a REINFORCE method.

In a block 206, the computing device 110 uses the LSTM model to determine a processing unit selection for the plurality of network layers, based on a duration required for training each of the network layers by each type of the multiple types of the processing units, and a cost of each type of the multiple types of the processing unit. According to at least one embodiment of the disclosure, the processing unit selection may include the type of the processing unit to be used for each of the multiple network layers of the neural network, and may further include the number of the processing units to be used for each of the multiple network layers of the neural network. The processing unit selection makes the total cost of the processing units used by the neural network below the cost threshold, in response to the duration for pipelining parallel computing required for training the neural network being shorter than the present duration, wherein the cost threshold may be a threshold preset by a user on the basis of cost desired to be paid.

According to at least one embodiment of the disclosure, the step of determining a processing unit selection for the multiple network layers may includes: determining the processing unit selection, so as to make the total cost of the processing units used by the neural network below the cost threshold, in response to the duration for pipelining parallel computing for training the neural network being shorter than the present duration. Under the circumstance, the method 200 uses the LSTM model to find, under a constraint of the present duration, the processing unit selection that minimizes the total cost as far as possible.

According to at least one embodiment of the disclosure, each of the multiple network layers of the neural network is trained by one type of processing unit. In order to reduce time for transferring data between different processing units, adjacent network layers using the same type of the processing unit may be merged, and the adjacent network layers merged and using the same type of the processing unit may be referred to as stages. In other words, the neural network having the multiple network layers may be divided into multiple stages, and each of the multiple stages is trained by the same type of the processing unit.

FIG. 3 shows a schematic diagram of a divided neural network 300 according to the embodiment of the disclosure. As shown in FIG. 3, there are six network layers 301, 302, 303, 304, 305 and 306 in the neural network 300, wherein the network layers 301 and 302 are divided into a stage 310 and are trained by the same type of the processing unit, the network layer 303 acts as one stage 320 alone and is trained by the same type of the processing unit, and the network layers 304, 305 and 306 are divided into a stage 330 and are trained by the same type of the processing unit. According to at least one embodiment of the disclosure, the type of the processing unit used for the stage 320, the type of the processing unit used for the stage 310 and the type of the processing unit used for the stage 330 are all different, but the type of the processing unit used for the stage 310 and the type of the processing unit used for the stage 330 may be identical. In other words, division of the neural network 300 only requires that different types of the processing units are used in two adjacent stages.

According to at least one embodiment of the disclosure, in order to a duration for reduce training of the whole neural network, training may be carried out in a pipelining parallel mode, such that the network layers corresponding to different stages may be trained in parallel, which may support overlapping computing and reduce communication overhead, thereby computing time consumption and communication time consumption is reduced. In one stage, data parallelism may be realized by multiple of the same type of the processing units, and the computing time consumption may be reduced by increasing the number of the same type of the processing unit in the stage. Therefore, the duration for pipelining parallel computing may be determined based on that a total duration required for training the adjacent network layers in at least one set of adjacent network layers, wherein the adjacent network layers is indicated by the processing unit selection and uses the same type of the processing unit, of the multiple network layers.

According to at least one embodiment of the disclosure, the duration for pipelining parallel computing required for training the neural network may be equal to a duration for training of the stage that consumes the longest time among various stages, which may be shown in the following formula (1):

$$T = \max_{i \in \{1,2,\ldots,m\}} T_i \tag{1}$$

In the formula (1), T is the duration for pipelining parallel computing required for training the neural network, $T_i$ represents the training duration of the i-th stage, and m represent the number of the stages divided for the neural network.

FIG. 4 shows a flow diagram of a neural network training method 400 according to the embodiment of the disclosure. Specifically, the neural network training method 400 may be carried out by the computing device 110 in the neural network training environment 100 shown in FIG. 1. It should be understood that the neural network training method 400 may be considered as a specific portion of the neural network training method 200, may be used for determining time consumption for training a certain network layer of the multiple network layers, and may also include additional operations not shown and/or operations shown may be omitted, and the scope of the disclosure is not limited in this respect.

In a block 402, the computing device 110 determines a duration required for training the first network layer of the multiple network layers by each type of the multiple types of the processing units based on that a profile associated with training for the first network layer. According to at least one embodiment of the disclosure, the computing device 110 may determine a duration required for training the network layer by each type of the multiple types of the processing units, based on that the profile associated with training for a certain network layer of the multiple network layers, and through a mode of training, by the different processing units, each of operators corresponding to the network layer, and carrying out multiple times of iterative averaging, etc.

During the neural network is divided and trained, the computing time consumption for each of the network layers is usually much longer than the communication time consumption for the each of the network layer. Under the circumstance, a duration determined by the block 402 and required for training the network layer by each type of the multiple types of the processing units is the time consumption for training the network layer.

In a block 404, the computing device 110 determines a parameter transfer duration for the first network layer based on that at least one parameter associated with training for the first network layer and to be transferred, and a network bandwidth used for transferring the at least one parameter. According to at least one embodiment of the disclosure, the computing device 110 may determine the parameter transfer duration for the first network layer by dividing the parameter by the network bandwidth, based on that the at least one parameter associated with training for the first network layer and to be transferred, and the network bandwidth used for transferring the at least one parameter and obtained by pressure measurement, etc.

During the neural network is divided and trained, the computing time consumption for a certain network layer may be equal to the communication time consumption for the network layer. Under the circumstance, the parameter transfer duration for the network layer needs to be determined by the block 404 so as to be compared with the time consumption for training the network layer.

In a block 406, in response to the parameter transfer duration determined in the block 404 being longer than the duration determined in the block 402 and required for training the first network layer by each type of the multiple types of the processing units, the computing device 110 makes a duration for training the first network layer by each type of the multiple types of the processing units equal to the parameter transfer duration. In other words, under the circumstance, the parameter transfer duration determined in the block 404 would be determined as a duration for training the network layer.

On the basis of the method 400, a duration for training each stage may be as shown in the following formula (2):

$$T_j = P\left(\max\left(\sum_{i=q_j}^{q_{j+1}-1} T_{comp}(l_i, d_i), \sum_{i=q_j}^{q_{j+1}-1} T_{comm}(l_i, d_i, d_{i+1})\right), n_j\right) \quad (2)$$

In the formula (2), $q_j$ represents the j-th stage, $T_{comp}$ represents the computing time consumption, $T_{comm}$ represents the communication time consumption, $d_i$ represents the processing unit selected for training the stage, $d_{i+1}$ represents a next processing unit for transmitting the parameter and carrying out subsequent training, $l_i$ represents the network layer in the stage, and $n_j$ represents the number of the processing unit in the j-th stage. In the formula (2), when the communication time consumption is summed, the communication time consumption between the different network layers in one stage may be likely ignored, and under the circumstance, the formula (2) does not need to be subjected to summing, and only the communication time consumption between the last network layer in the stage and the first network layer in the next stage needs to be considered.

According to at least one embodiment of the disclosure, when the processing unit selection is determined, the computing device 110 may use the LSTM model to determine, the type of the processing unit to be used for the network layer based on that the duration required for training a certain network layer by using each type of the multiple of types of the processing units, the cost of each type of the multiple types of the processing units, and the type of the processing unit determined for a previous network layer of the network layer. Under the circumstance, the computing device 110 needs to consider that the type of the selected processing unit should be identical with the type of the processing unit for the previous network layer as far as possible such that the divided stages may include more network layers, and then the communication time consumption between the stages may be reduced. In addition, for each model layer of the LSTM model, input data may include input data of the network layer, an input parameter of the network layer, training time for training the network layer by the different processing units, and the type of the processing unit determined for the previous network layer of the network layer.

As described above, in the method 200, the LSTM model and the REINFORCE method may be used, etc. When the LSTM model is used, probability of using the different processing units for each network layer may be acquired by carrying out softmax operation on an output result of the LSTM model, and then the type of the processing unit to be used for each of the network layers may be determined directly by taking a maximum value or combining the type of the processing unit determined for the previous network layer of the network layer.

When the REINFORCE method is used, a gradient for indicating a training direction of the LSTM model may be represented by the following formula (3):

$$\nabla_\theta R(\theta) = E_{P(a_{T:1}:\theta)}\left[\left(\sum_{t=1}^{T} \nabla_\theta \log P(a_t|a_{(t-1)}; \theta)\right) R_i\right] \quad (3)$$

In the formula (3), E represents an expected value is taken, T represents the duration for pipelining parallel computing which should be shorter than the present duration and is required for training the neural network, R represents a return value of taking a negative value of the cost of the processing units, etc., $\theta$ represents a parameter of the LSTM model, $a_t$ and $a_{(t-1)}$ represents actions taken at moments t and t+1, for example, with regard to actions of selecting different types of the processing units for the network layer, an l is a trajectory from the action a1 at a moment t=1 to the action aT at a moment t=T, $\nabla_\theta R(\theta)$ is a gradient of a return value for the parameter $\theta$, Ep( )[ . . . . Ri] means that a trajectory from the action a1 to the action aT is sampled to calculate an expected value of reward R, and P represents a probability of selecting different types of the processing units for the network layer.

With regard to the formula (3), according to the Monte Carlo's theorem, an approximation of the gradient represented by the following formula (4) may be sampled:

$$\nabla_\theta R(\theta) \approx \frac{1}{N}\sum_{t=1}^{N}\left(\sum_{t=1}^{T} \nabla_\theta \log P(a_t|a_{(t-1)}; \theta)\right) R_i \quad (4)$$

In the formula (4), N represents the number of collected samples.

Then, in order to greatly reduce a variance estimated when the LSTM model is used for computing and enable the training to be more stable, a baseline B may be substituted into the above formula (4), wherein the baseline B may be acquired by moving an average reward return value R, such that the R value during the training may be smoother. Under the circumstance, the following formula (5) is obtained:

$$\nabla_\theta R(\theta) \approx \frac{1}{N}\sum_{t=1}^{N}\left(\sum_{t=1}^{T} \log P(a_t|a_{(t-1)}; \theta)\right)(R_i - b) \quad (5)$$

By using the above formula (5), the processing unit selection, that is, the type of the processing unit to be used for each of the multiple network layers, for the multiple network layers of the neural network may be acquired.

The deep reinforcement learning method based on a policy gradient is described above. It should be understood that the embodiments of the disclosure may also be implemented by a deep reinforcement learning method base on a value function.

FIG. 5 shows a flow diagram of a neural network training method 500 according to the embodiment of the disclosure. Specifically, the neural network training method 500 may be carried out by the computing device 110 in the neural network training environment 100 shown in FIG. 1. It should be understood that the neural network training method 500 may be considered as an extension of the neural network training method 200, and may also include additional operations not shown and/or operations shown may be omitted, and the scope of the disclosure is not limited in this respect.

In a block 502, the computing device 110 acquires the neural network for the deep learning. Special content of steps involved in the block 502 are identical with that of steps involved in the block 202, and will not be described here.

In a block 504, the computing device 110 constructs an LSTM model for the neural network acquired in the block 202. Special content of steps involved in the block 504 are identical with that of steps involved in the block 204, and will not be described here.

In a block 506, the computing device 110 uses the LSTM model to determine the processing unit selection for the multiple network layers on the basis of the duration required for training each of the network layers using each type of the multiple of types of the processing units, and the cost of each type of the multiple types of the processing units. Special content of steps involved in the block 506 are identical with that of steps involved in the block 206, and will not be described here.

In a block 508, the computing device 110 determines the number of the processing units to be used for each of the multiple network layers, based on the processing unit selection determined in the block 506, and by means of the type of the processing unit to be used for each of the multiple network layers, the duration required by one processing unit of the type for each of the network layers for training the network layer, and the duration for pipelining parallel computing for training the neural network.

According to at least one embodiment of the disclosure, the total cost of the processing units used by the neural network may be represented by the following formula (6):

$$\operatorname*{argmin}_{D} \sum n_d c_d$$

$$s.t.\, T+T_{margin} < T_{expected} \tag{6}$$

In the formula (6), D represents different types of the processing units, $n_d$ represents the number of the processing units used, $c_d$ represents unit cost of the processing units used, T represents an estimated training time for each round, that is, the duration for pipelining parallel computing required for training the neural network, $T_{expected}$ represents the present duration, and $T_{margin}$ represents a boundary time used for facilitating error reduction.

According to some embodiments of the disclosure, the boundary time $T_{margin}$ may not be considered, and under the circumstance, in the formula (6), the boundary time $T_{margin}$ will not be included, and only the present duration $T_{expected}$ is included.

According to some other embodiments of the disclosure, since the boundary time $T_{margin}$ may be fixed, a value acquired by subtracting the boundary time $T_{margin}$ from the present duration $T_{expected}$ may be listed independently, such that the formula (6) may be simplified, and the aforementioned obtained value may also be referred to as the present duration $T_{expected}$.

Therefore, in combination with the above formula (6), the number of the processing units to be used for each of the multiple network layers may be acquired by dividing the duration for pipelining parallel computing for training the neural network by the duration required by one processing unit with the type for each of the network layers for training the network layer. It should be understood that under the circumstance it is considered that computing and transmission in each of the network layers and each stage may be carried out completely in parallel.

According to some other embodiments of the disclosure, in a block 508, the computing device 110 determines the number of the processing units to be used for each of the multiple network layers, based on that the processing unit selection determined in the block 506, and by means of the type of the processing unit to be used for each of the multiple network layers, the duration required by one processing unit of the type for each of the network layers for training the network layer, a proportion of a portion of the network layer that may be used for parallel training, and the duration for pipelining parallel computing for training the neural network.

Under the circumstance, assuming that the proportion of the portion in the network layer that may be used for parallel training is p, the number n of the processing units used and a lifting acceleration S for computing a speed follow the following formula (7) according to an AMDAL's law:

$$S = \frac{1}{1 - p + \dfrac{p}{n}} \tag{7}$$

Under the circumstance, in combination with the formula (2), the duration for each stage may be represented by the following formula (8):

$$P(t, n) = t\left(1 - p + \frac{p}{n}\right) \tag{8}$$

In the above formulas (7) and (8), the proportion p may be acquired by estimating for the network layer. For example, during parallel computing, portions executed by the operator may be parallel, and some common portions that each machine needs to execute by calling a framework, starting multiple threads, etc. may also be parallel, such that the proportion p may be estimated on the basis of these factors.

FIGS. 1-5 describe content related to the neural network training environment 100 in which the neural network training methods in certain embodiments of the disclosure may be implemented, the neural network training method 200 according to the embodiment of the disclosure, the divided neural network 300 according to the embodiment of the disclosure, the neural network training method 400 according to the embodiment of the disclosure, and the neural network training method 500 according to the embodiment of the disclosure. It should be understood that the foregoing description is intended to better illustrate what is recited in the disclosure and is not intended to be limited in any mode.

It should be understood that the number of various elements and the magnitude of physical quantities employed in the various figures described above of the disclosure are only examples and are not intended to limit the scope of the disclosure. The numbers and magnitudes described above may be arbitrarily set as desired without affecting the normal implementation of the embodiments of the disclosure.

The details of the neural network training method 200, the neural network training method 400, and the neural network training method 500 according to the embodiments of the disclosure are described above with reference to FIGS. 1-5. Hereinafter, each component of the neural network training apparatus will be described with reference to FIG. 6.

Figure 6:
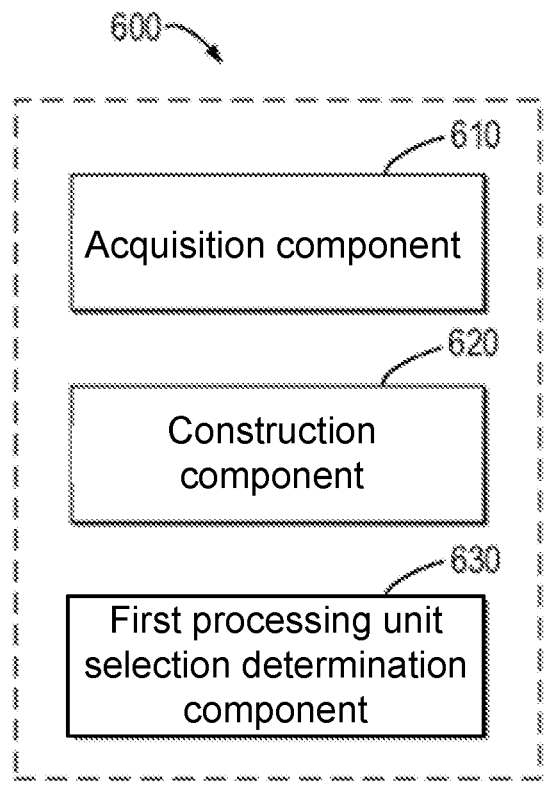
FIG. 6 shows a schematic block diagram of a neural network training apparatus 600 according to the embodiment of the disclosure.

FIG. 6 is a schematic block diagram of a neural network training apparatus 600 according to the embodiment of the disclosure. As shown in FIG. 6, the neural network training apparatus 600 includes an acquisition component 610 configured to acquire a neural network for deep learning, wherein the neural network includes multiple network layers, and each of the multiple network layers is trained by one type of multiple of processing units; a construction component 620 configured to construct a deep reinforcement learning model for the neural network, wherein the deep reinforcement learning model includes multiple model layers corresponding to the multiple network layers in a one-to-one correspondence to the multiple network layers; and a first processing unit selection determination component 630 configured to determine a processing unit selection for the multiple network layer, based on a duration required for training each network layer by each type of the plurality of types of the processing units, and a cost of each type of the multiple types of the processing units, through the deep reinforcement learning model, wherein the processing unit selection includes the type of the processing unit to be used for each of the multiple network layers, and the processing unit selection is used for making a total cost of the processing units used by the neural network below a cost threshold, in response to a duration for pipelining parallel computing required for training the neural network being shorter than a present duration.

In at least one embodiment, the first processing unit selection determination component 630 includes: a duration determination component (not shown) configured to determine a duration for training the first network layer by each type of the multiple types of the processing units based on a profile associated with training for the first network layer.

In at least one embodiment, the first processing unit selection determination component 630 includes: a parameter transfer duration component (not shown) configured to determine a duration for a parameter transfer for the first network layer of the multiple network layers based on at least one parameter associated with training for the first network layer and to be transferred, and a network bandwidth used for transferring the at least one parameter; and a duration adjustment component (not shown) configured to make the duration for training the first network layer by each type of the multiple types of the processing units equal to the parameter transfer duration, in response to the parameter transfer duration being longer than the duration for training the first network layer by each type of the multiple types of the processing units.

In at least one embodiment, the first processing unit selection determination component 630 includes: a type determination component (not shown) configured to determine, through the deep reinforcement learning model, the type of the processing unit to be used by a first network layer of the plurality of network layers based on a duration for training the first network layer by each type of the plurality of types of the processing units, the cost of each type of the multiple types of the processing units, and a type of the processing unit determined for a previous network layer of the first network layer, the type of the processing unit to be used for the first network layer.

In at least one embodiment of the disclosure, the first processing unit selection determination component 630 includes: a second processing unit selection determination component (not shown) configured to determine the processing unit selection to make the total cost of the processing units used by the neural network below the cost threshold, in response to the duration for pipelining parallel computing for training the neural network being shorter than the present duration.

In at least one embodiment of the disclosure, the neural network training apparatus 600 further includes: a duration for pipelining parallel computing determination component (not shown) configured to determine the duration for pipelining parallel computing based on a total duration for training adjacent network layers in at least one set of adjacent network layers, wherein the adjacent network layers is indicated by the processing unit selection and uses the same type of the processing unit, of the multiple network layers.

In at least one embodiment of the disclosure, the neural network training apparatus 600 further includes: a first number determination component (not shown) configured to determine the number of the processing units to be used for each of the multiple network layers through the type of the processing units to be used by each of the plurality of the network layers, a duration for training each of the plurality of the network layers, and the duration for pipelining parallel computing, based on the processing unit selection, wherein each of the plurality of the network layers is trained by one processing unit with the type for each of the plurality of the network layers.

In at least one embodiment of the disclosure, the neural network training apparatus 600 further includes: a second number determination component (not shown) configured to determine the number of the processing units to be used for each of the plurality of the network layers, through the type of the processing units to be used by each of the plurality of the network layers, a duration for training each of the plurality of the network layers, a proportion of a portion of each of the plurality of the network layers that can be used for parallel training, and the duration for pipelining parallel computing, wherein each of the plurality of the network layers is trained by one processing unit with the type for each of the plurality of the network layers.

In at least one embodiment of the disclosure, the processing units include a central processing unit and a special processing unit.

From the above description with reference to FIGS. 1-6, the technical solutions according to the embodiments of the disclosure have many advantages over a traditional solution. For example, by using the technical solutions according to the embodiments of the disclosure, an object function does not need to be differentiable when the problem is solved by the deep reinforcement learning, such that the problem with at least one constraint may be well solved, generalization is strong, and the method is suitable for solving more general problems. Specifically, by using the technical solutions according to the embodiments of the disclosure, the neural network may be divided the most reasonably, so as to realize distributed training, improve efficiency of the deep learning, and improve, by reducing cost of deep learning by a user, experience of using the deep learning by the user.

The embodiments of the disclosure further provide an electronic device, a non-transitory storage medium and a computer program product.

Figure 7:
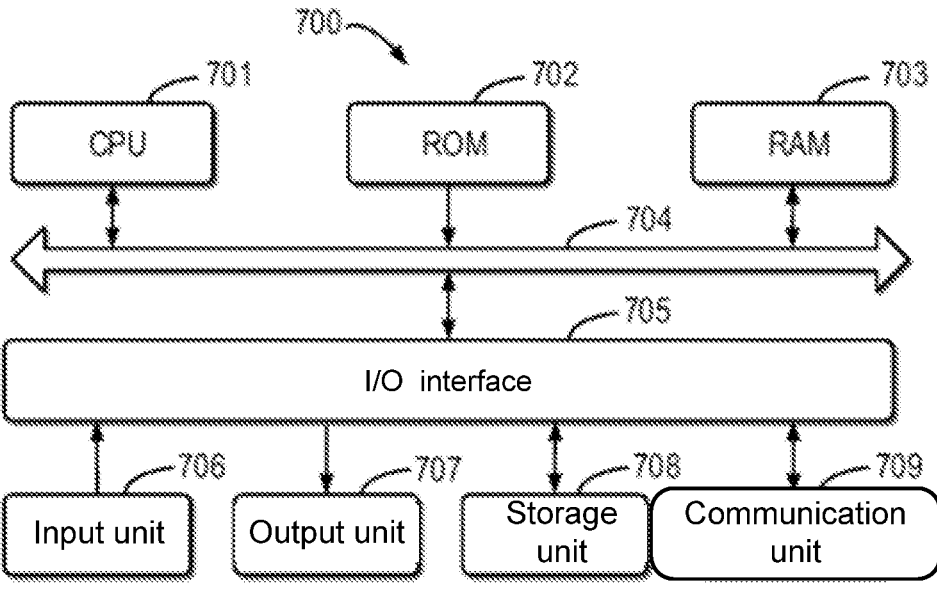
FIG. 7 shows a schematic block diagram of an exemplary electronic device 700 that may be used for implementing the embodiments of the disclosure.

FIG. 7 shows a schematic block diagram of an exemplary electronic device 700 that may be used for implementing the embodiments of the disclosure. For example, the computing device 110 shown in FIG. 1 and the neural network training apparatus 600 shown in FIG. 6 may be implemented by the electronic device 700. The electronic device 700 is intended to represent various forms of digital computers, such as laptop computers, desktop computers, workstations, personal digital assistants, servers, blade servers, mainframe computers and other suitable computers. The electronic device may also represent various forms of mobile apparatuses, such as personal digital processors, cellular telephones, smart phones, wearable apparatuses, and other similar computing apparatuses. The components shown herein, connections and relationships thereof, and functions thereof are only examples, and are not intended to limit the implementation of the disclosure described and/or claimed herein.

As shown in FIG. 7, the device 700 includes a computing unit 701 which may carry out various suitable actions and processes according to a computer program stored in a read only memory (ROM) 702 or loaded into a random access memory (RAM) 703 from a storage unit 708. In the RAM 703, various programs and data required for operations of the device 700 may also be stored. The computing unit 701, the ROM 702 and the RAM 703 are connected to each other by means of a bus 704. An input/output (I/O) interface 705 is also connected to the bus 704.

Multiple components in the device 700 are connected to the I/O interface 705, and includes: an input unit 706 such as a keyboard and a mouse; an output unit 707 such as various types of displays and speakers; a storage unit 708 such as a magnetic disk and an optical disk; and a communication unit 709 such as a network card, a modem and a wireless communication transceiver. The communication unit 709 allows the device 700 to exchange information/data with other devices via computer networks such as the internet and/or various telecommunication networks.

The computing unit 701 may be various general and/or special processing assemblies having processing and computing abilities. Some examples of the computing unit 701 include, but are not limited to, central processing units (CPUs), graphics processing units (GPUs), various special artificial intelligence (AI) computing chips, various computing units that run machine learning model algorithms, digital signal processors (DSPs) and any suitable processors, controllers, microcontrollers, etc. The computing unit 701 carries out the various methods and processes described above, such as the methods 200, 400 and 500. For example, in some embodiments, the methods 200, 400 and 500 may be implemented as computer software programs tangibly embodied on a machine-readable medium, such as the storage unit 708. In some embodiments, some or all computer programs may be loaded and/or installed on the device 700 by means of the ROM 702 and/or the communication unit 709. When the computer program is loaded into the RAM 703 and executed by the computing unit 701, one or more of the steps of methods 200, 400 and 500 described above may be carried out. Alternatively, in other embodiments, the computing unit 701 may be configured to carry out the methods 200, 400 and 500 in any other suitable mode (that is, by means of firmware).

Various embodiments of the systems and techniques described above herein may be implemented in a digital electronic circuit system, an integrated circuit system, a field programmable gate array (FPGA), an application-specific integrated circuit (ASIC), an application specific standard product (ASSP), a system on a chip (SOC), a load programmable logic apparatus (CPLD), computer hardware, firmware, software, and/or combinations thereof. These various embodiments may be implemented in one or more computer programs. The one or more computer programs can be executed and/or interpreted on a programmable system including at least one programmable processor. The programmable processor may be a special or general programmable processor, and may receive data and instructions from a storage system, at least one input apparatus and at least one output apparatus and transmit data and instructions to the storage system, the at least one input apparatus and the at least one output apparatus.

A program code for implementing the methods of the disclosure may be written by any combination of one or more programming languages. The program code may be provided to a processor or controller of a general computer, a special computer or other programmable data processing apparatus such that the program code, when executed by the processor or controller, enables functions/operations specified in the flow diagram and/or a block diagram to be implemented. The program code may be completely executed on a machine, partially executed on the machine, partially executed, as a stand-alone software package, on the machine and partially executed on a remote machine, or completely executed on the remote machine or a server.

In the context of the disclosure, a machine-readable medium may be a tangible medium which may contain or store a program for being used by an instruction execution system, apparatus or device or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices, or any suitable combination of the foregoing. More specific examples of the machine-readable storage medium may include an electrical connection based on one or more wires, a portable computer disk, a hard disk, a RAM, a ROM, an erasable programmable read-only memory (EPROM or a flash memory), an optical fiber, a compact disk read-only memory (CD-ROM), an optical storage apparatus, a magnetic storage apparatus or any suitable combination of the foregoing.

In order to provide interaction with a user, the systems and techniques described herein may be implemented on a computer.

The computer have a display apparatus [such as, a CRT (cathode ray tube) or an LCD (liquid crystal display) monitor] for displaying information to the user; and a keyboard and a pointing apparatus (such as a mouse or a trackball), through which the user can provide an input to the computer. Other kinds of apparatuses may also be used to provide interaction with the user. For example, feedback provided to the user may be any form of sensory feedback (such as visual feedback, auditory feedback or tactile feedback); and may receive input from the user in any form (including acoustic input, speech input or tactile input).

The systems and techniques described herein may be implemented in a computing system (such as a data server) that includes a background component, a computing system (such as an application server) that includes a middleware component, a computing system that includes a front-end component (such as a user computer with a graphical user interface or a web browser, through which a user may interact with embodiments of the systems and techniques described herein), or a computing system that includes any combination of the background component, the middleware component or the front-end component. The components of the system may be interconnected by digital data communication (such as a communication network) of any form or medium. Examples of the communication network include a local area network (LAN), a wide area network (WAN) and the internet.

Generally remote from each other and typically interact through the communication network. A client and server relation is generated by computer programs running on respective computers and having client-to-server relations with each other.

It should be understood that steps may be reordered, added or deleted by using the various forms of flow shown above. For example, the steps described in the disclosure may be carried out in parallel, sequentially, or in different orders, and are not limited herein as long as the desired results of the disclosed solutions of the disclosure can be achieved.

The above specific implementation modes do not constitute a limitation on the scope of protection of the disclosure. Those skilled in the art should understand that according to design requirements and other factors, various modifications, combinations, sub-combinations and substitutions may be made. Any modifications, equivalent substitutions, improvements, etc. within the spirit and principles of the disclosure are intended to be included within the scope of protection of the disclosure.

What is claimed is:

1. A neural network training method, comprising: acquiring a neural network for deep learning, wherein the neural network comprises a plurality of network layers, and each of the plurality of network layers is trained by one type of a plurality of types of processing units;
constructing a deep reinforcement learning model for the neural network, wherein the deep reinforcement learning model comprises a plurality of model layers in a one-to-one correspondence to the plurality of network layers; and
determining, through the deep reinforcement learning model, a processing unit selection for the plurality of the network layers based on a duration for training each of the network layers by each type of the plurality of types of the processing units, and a cost of each type of the plurality of types of the processing units, wherein the processing unit selection comprises the type of the processing unit to be used for each of the plurality of the network layers and a number of the processing units to be used for each multiple network layers of the neural network, and the processing unit selection is used for making a total cost of the processing units used by the neural network below a cost threshold, in response to a duration for pipelining parallel computing for training the neural network being shorter than a present duration, wherein acquiring the neural network for deep learning comprises:
dividing the plurality of network layers in the neural network into multiple stages, wherein the multiple stages comprises adjacent network layers to be using the same type of the processing unit in each of the plurality of network layers, and
acquiring the neural network, by the same type of the processing unit to train the multiple stages;
determining the processing unit selection comprises:
determining a duration for training a first network layer of the plurality of network layers by each type of the plurality of types of the processing units based on a profile associated with training for the first network layer.

2. The method as claimed in claim 1, wherein determining the processing unit selection comprises:
determining a parameter transfer duration for the first network layer of the plurality of network layers based on at least one parameter associated with training for the first network layer and to be transferred, and a network bandwidth used for transferring the at least one parameter; and
in response to the parameter transfer duration being longer than the duration for training the first network layer by each type of the multiple types of the processing units, making the duration for training the first network layer by each type of the plurality of types of the processing unit be equal to the parameter transfer duration.

3. The method as claimed in claim 1, wherein determining the processing unit selection comprises: determining, through the deep reinforcement learning model, the type of the processing unit to be used by the first network layer of the plurality of network layers based on the duration for training the first network layer by each type of the plurality of types of the processing units, the cost of each type of the plurality of types of the processing units, and a type of the processing unit determined for a previous network layer of the first network layer.

4. The method as claimed in claim 1, wherein determining the processing unit selection comprises:
determining the processing unit selection to make the total cost of the processing units used by the neural network below the cost threshold, in response to the duration for pipelining parallel computing for training the neural network being shorter than the present duration.

5. The method as claimed in claim 1, further comprising:
determining the duration for pipelining parallel computing based on a total duration for training adjacent network layers in at least one set of adjacent network layers, wherein the adjacent network layers is indicated by the processing unit selection and uses the same type of the processing units, of the plurality of the network layers.

6. The method as claimed in claim 1, further comprising:
determining a number of the processing units to be used for each of the plurality of the network layers through the type of the processing units to be used by each of the plurality of the network layers, a duration for training each of the plurality of the network layers, and the duration for pipelining parallel computing, based on the processing unit selection, wherein each of the plurality of the network layers is trained by one processing unit with the type for each of the plurality of the network layers, the number of the processing units is used for reducing a computing time consumption of the training neural network.

7. The method as claimed in claim 1, further comprising:
determining a number of the processing units to be used for each of the plurality of the network layers through the type of the processing units to be used by each of the plurality of the network layers, a duration for training each of the plurality of the network layers, a proportion of a portion of each of the plurality of the network layers that can be used for parallel training, and the duration for pipelining parallel computing, wherein each of the plurality of the network layers is trained by one processing unit with the type for each of the plurality of the network layers, the number of the processing units is used for reducing a computing time consumption of the training neural network.

8. The method as claimed in claim 1, wherein the processing units comprise a central processing unit and a special processing unit.

9. The method as claimed in claim 1, wherein the profile is each operators corresponding to the first network layer, wherein the operators execute a portion of each of the plurality of the network layers used for parallel training.

10. The method as claimed in claim 1, wherein the duration for training the first network layer by each type of the plurality of the types of the processing units is time consumption for training the first network layer.

11. The method as claimed in claim 2, wherein determining the parameter transfer duration for the first network layer of the plurality of network layers based on the at least one parameter associated with training for the first network layer and to be transferred, and the network bandwidth used for transferring the at least one parameter comprises:

determining the parameter transfer duration for the first network layer by dividing the at least one parameter associated with training for the first network layer and to be transferred by the network bandwidth.

12. The method as claimed in claim 3, wherein the deep reinforcement learning model is LSTM model.

13. The method as claimed in claim 3, wherein the type of the processing unit to be used by the first network layer is identical with the type of the processing unit for the previous network layer.

14. The method as claimed in claim 6, wherein determining the number of the processing units to be used for each of the plurality of the network layers through the type of the processing units to be used by each of the plurality of the network layers, the duration for training each of the plurality of the network layers by one processing unit with the type for each of the plurality of the network layers, and the duration for pipelining parallel computing, based on the processing unit selection comprise:

determining the number of the processing units to be used for each of the multiple network layers through dividing the duration for pipelining parallel computing by the duration required by one processing unit with the type for each of the network layers.

15. The method as claimed in claim 7, wherein computing and transmission in each of the network layers and each stage may be carried out completely in parallel.

16. The method as claimed in claim 7, wherein the proportion is acquired by estimating for the network layer.

17. An electronic device, comprising at least one processor and a memory in communication connection with the at least one processor, wherein the memory stores an instruction capable of being executed by the at least one processor, and the instruction is executed by the at least one processor, so as to enable the at least one processor to execute the following steps:

acquiring a neural network for deep learning, wherein the neural network comprises a plurality of network layers, and each of the plurality of network layers is trained by one type of a plurality of types of processing units;

constructing a deep reinforcement learning model for the neural network, wherein the deep reinforcement learning model comprises a plurality of model layers in a one-to-one correspondence to the plurality of network layers; and determining, through the deep reinforcement learning model, a processing unit selection for the plurality of the network layers based on a duration for training each of the network layers by each type of the plurality of types of the processing units, and a cost of each type of the plurality of types of the processing units, wherein the processing unit selection comprises the type of the processing unit to be used for each of the plurality of the network layers and a number of the processing units to be used for each multiple network layers of the neural network, and the processing unit selection is used for making a total cost of the processing units used by the neural network below a cost threshold, in response to a duration for pipelining parallel computing for training the neural network being shorter than a present duration, wherein acquiring the neural network for deep learning comprises:

dividing the plurality of network layers in the neural network into multiple stages, wherein the multiple stages comprises adjacent network layers to be using the same type of the processing unit in each of the plurality of network layers, and acquiring the neural network, by the same type of the processing unit to train the multiple stages;

determining the processing unit selection comprises:

determining a duration for training a first network layer of the plurality of network layers by each type of the plurality of types of the processing units based on a profile associated with training for the first network layer.

18. A non-transitory storage medium storing a computer instruction, wherein the computer instruction is used for enabling a computer to execute a method of the following steps:

acquiring a neural network for deep learning, wherein the neural network comprises a plurality of network layers, and each of the plurality of network layers is trained by one type of a plurality of types of processing units;

constructing a deep reinforcement learning model for the neural network, wherein the deep reinforcement learning model comprises a plurality of model layers in a one-to-one correspondence to the plurality of network layers; and determining, through the deep reinforcement learning model, a processing unit selection for the plurality of the network layers based on a duration for training each of the network layers by each type of the plurality of types of the processing units, and a cost of each type of the plurality of types of the processing units, wherein the processing unit selection comprises the type of the processing unit to be used for each of the plurality of the network layers and a number of the processing units to be used for each multiple network layers of the neural network, and the processing unit selection is used for making a total cost of the processing units used by the neural network below a cost threshold, in response to duration for pipelining parallel computing for training the neural network being shorter than a present duration, wherein acquiring the neural network for deep learning comprises:

dividing the plurality of network layers in the neural network into multiple stages, wherein the multiple stages comprise adjacent network layers to be using the same type of the processing unit in each of the plurality of network layers, and acquiring the neural network, by the same type of the processing unit to train the multiple stages;

determining the processing unit selection comprises: determining a duration for training a first network layer of the plurality of network layers by each type of the plurality of types of the processing units based on a profile associated with training for the first network layer.

\* \* \* \* \*